(12) United States Patent
Ehnes

(10) Patent No.: US 6,457,558 B1
(45) Date of Patent: Oct. 1, 2002

(54) TIRE STEP APPARATUS

(76) Inventor: Steve L. Ehnes, P.O. Box 1357, Lebanon, MO (US) 65536

(*) Notice: Subject to any disclaimer, the term of this patent is extended or adjusted under 35 U.S.C. 154(b) by 0 days.

(21) Appl. No.: 09/656,410

(22) Filed: Sep. 6, 2000

Related U.S. Application Data

(63) Continuation-in-part of application No. 09/528,532, filed on Mar. 20, 2000, now abandoned.

(51) Int. Cl.[7] .............................. E04G 3/10; E04G 3/00; B60R 3/00
(52) U.S. Cl. .......................... 182/150; 182/90; 182/92; 280/165; 280/163
(58) Field of Search .............................. 182/90, 92, 93, 182/150, 165, 166, 88, 206; 280/165, 166, 169, 163

(56) References Cited

U.S. PATENT DOCUMENTS

| | | | | |
|---|---|---|---|---|
| 1,376,924 A | * | 5/1921 | Dixson | 182/150 X |
| 2,487,921 A | * | 11/1949 | Culver | 280/166 X |
| 2,653,036 A | * | 9/1953 | Creel et al. | 182/91 |
| 3,807,757 A | * | 4/1974 | Carpenter et al. | 280/166 |
| 3,876,230 A | * | 4/1975 | Phillips | 280/166 |
| 4,108,457 A | * | 8/1978 | Garrett | 182/95 X |
| 4,733,752 A | * | 3/1988 | Sklar | 182/86 |
| 5,941,342 A | * | 8/1999 | Lee | 182/95 |

\* cited by examiner

*Primary Examiner*—Daniel P. Stodola
*Assistant Examiner*—Hugh B. Thompson

(57) ABSTRACT

A step apparatus is provided for use on a vehicle tire and includes a first step assembly which includes a first step portion and a pair of first struts extending upward from the first step portion. A second step assembly includes a second step portion and a pair of end bracket members extending downward from the second step assembly. Each of the end bracket members includes a front bracket portion and a rear bracket portion. Hinge members are connected between the first struts and the front bracket portions. A pair of pawl assemblies are connected to the rear bracket portions. When the tire step apparatus is installed on a tire, a person can step up on the first step portion and the second step portion. Each of the first struts includes a stop member for contacting the tire when the apparatus is installed on the tire. Each of the pawl assemblies includes a pawl hinge connected to one of the rear bracket portions. A pawl plate is connected to the pawl hinge. The front bracket portions have a front bracket length, and the first struts have a first strut length. When the first step assembly is placed in a storage orientation, the first step portion is placed in registration in a nested relationship with the second step portion. In addition, a third step assembly can be connected by additional hinges to the first step assembly and can be folded around the second step assembly when in a storage orientation.

16 Claims, 9 Drawing Sheets

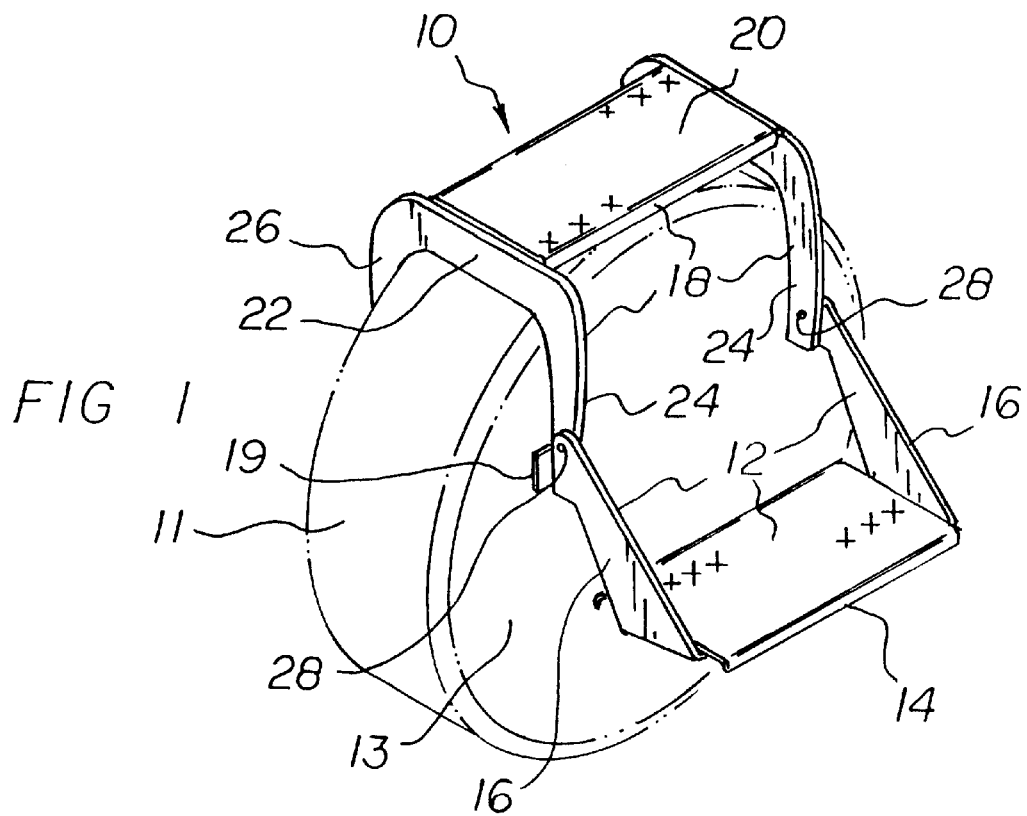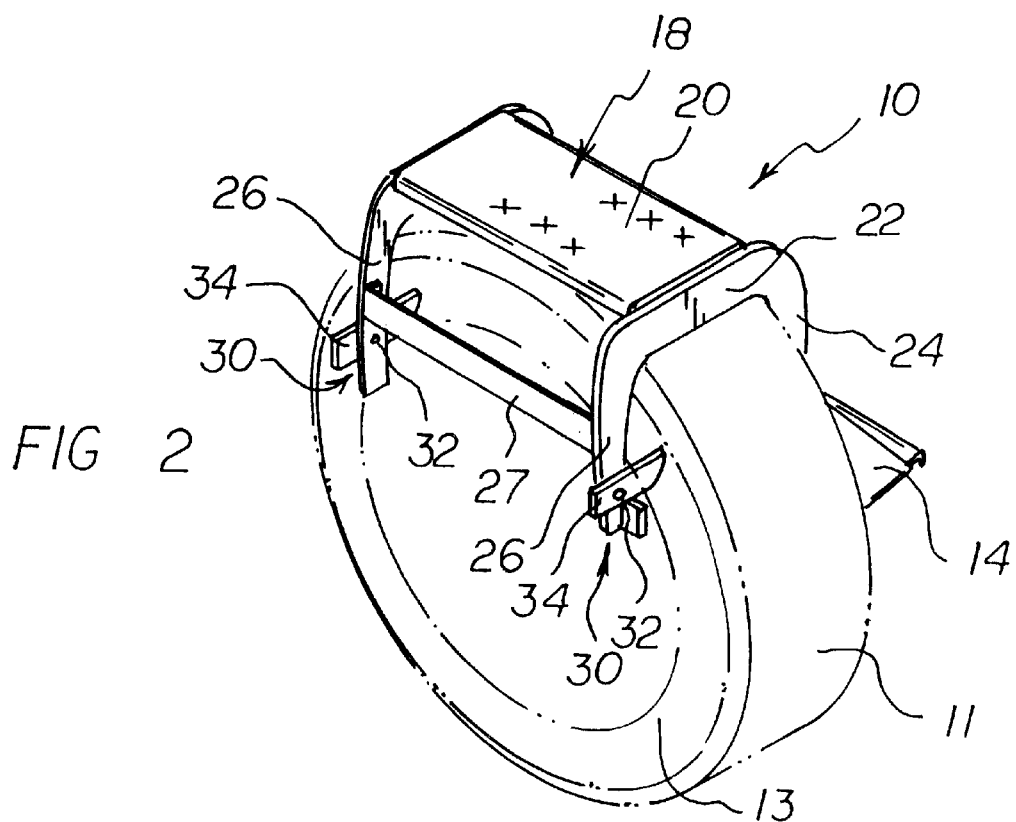

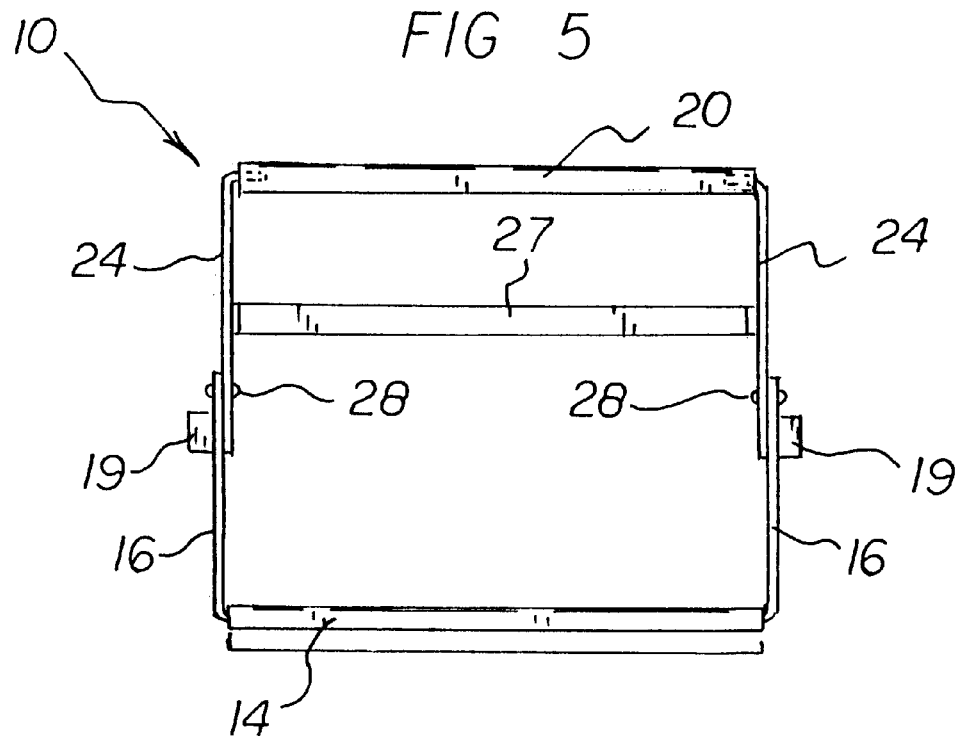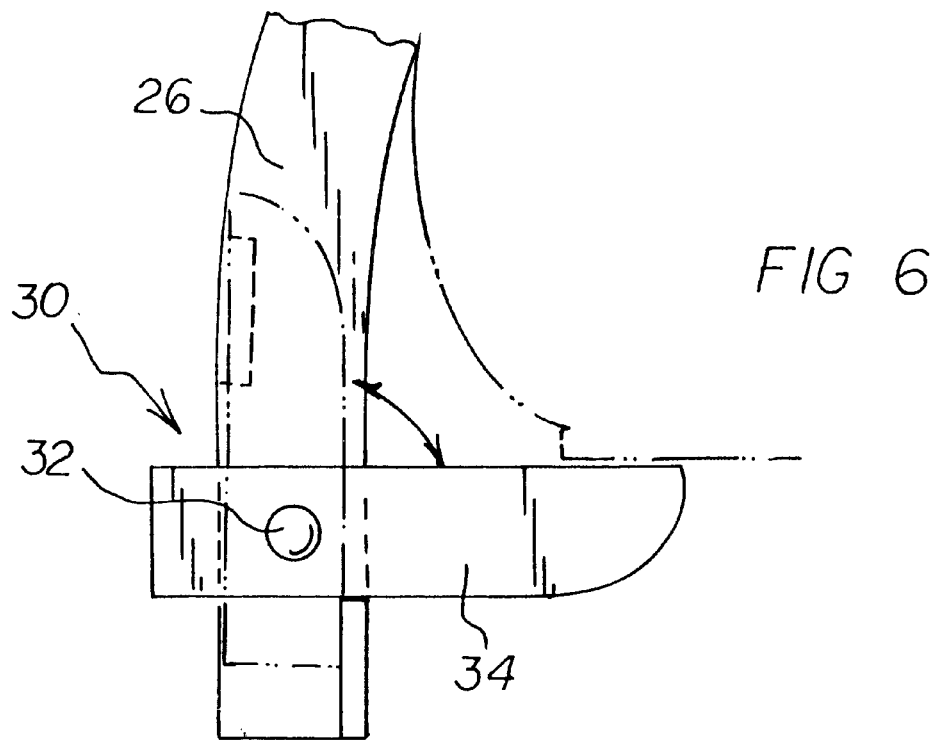

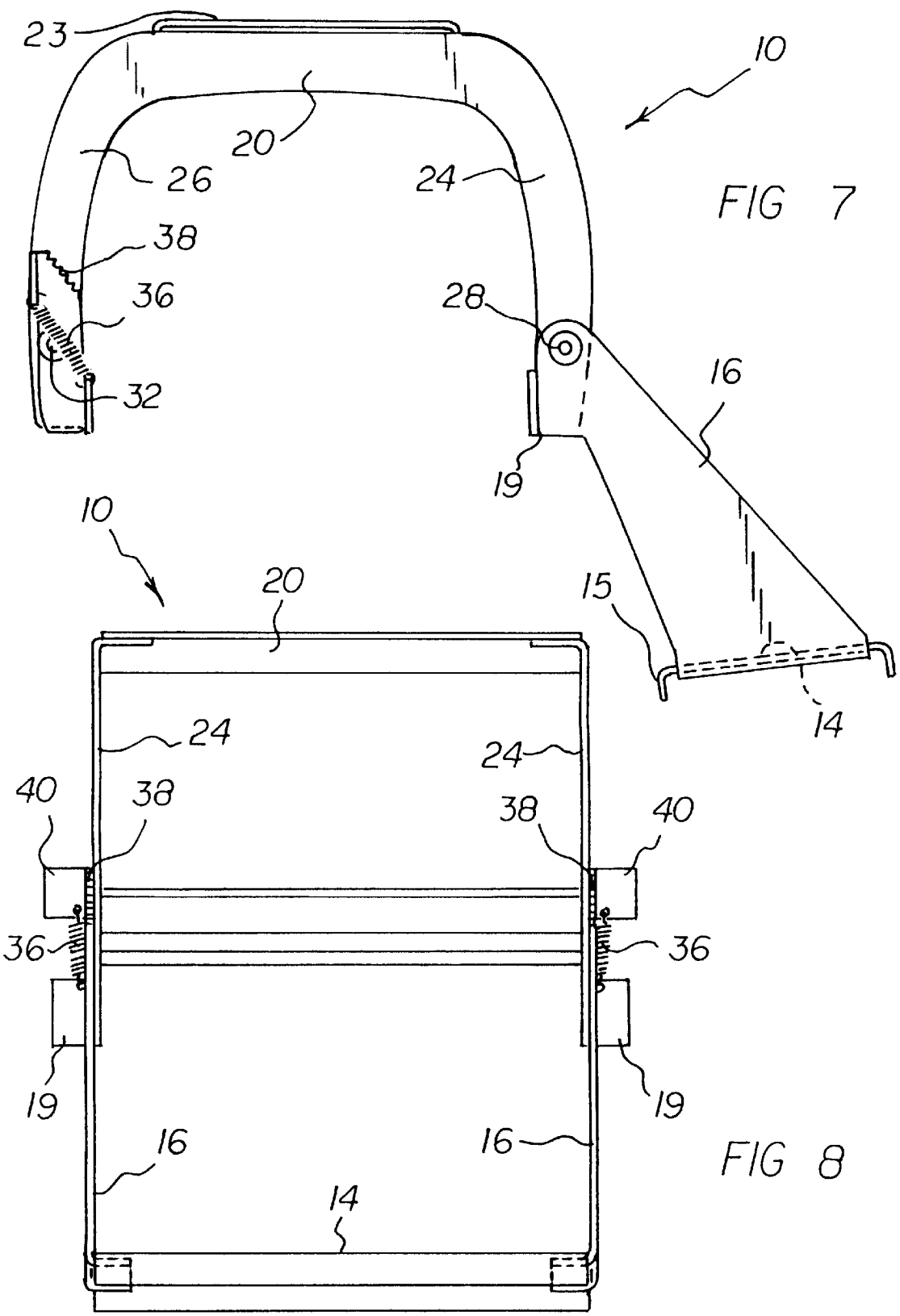

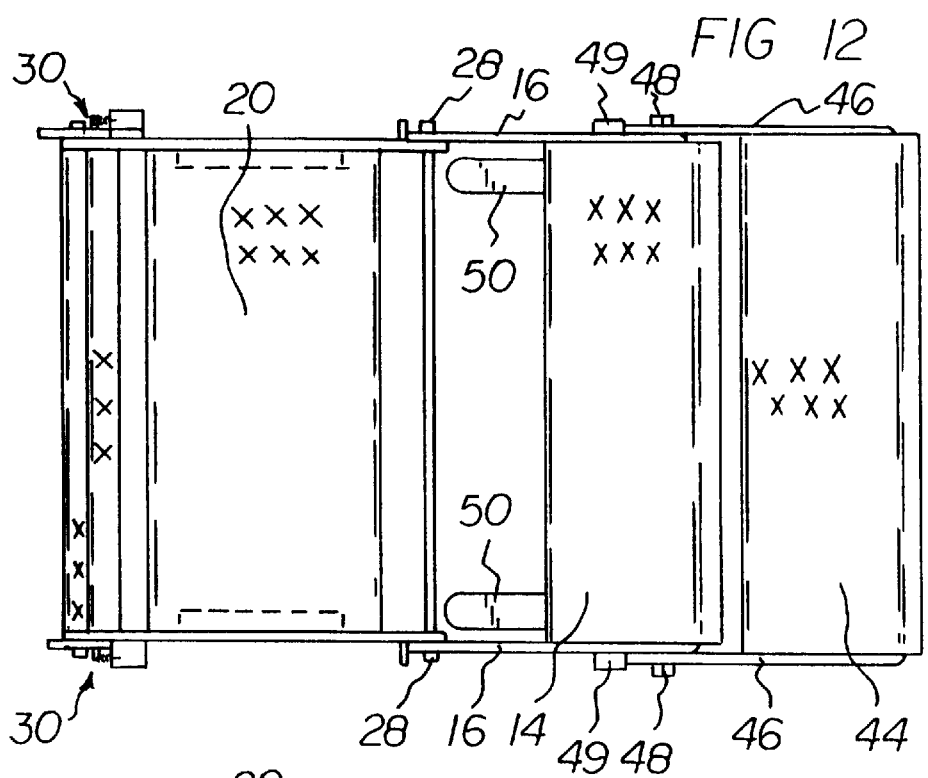
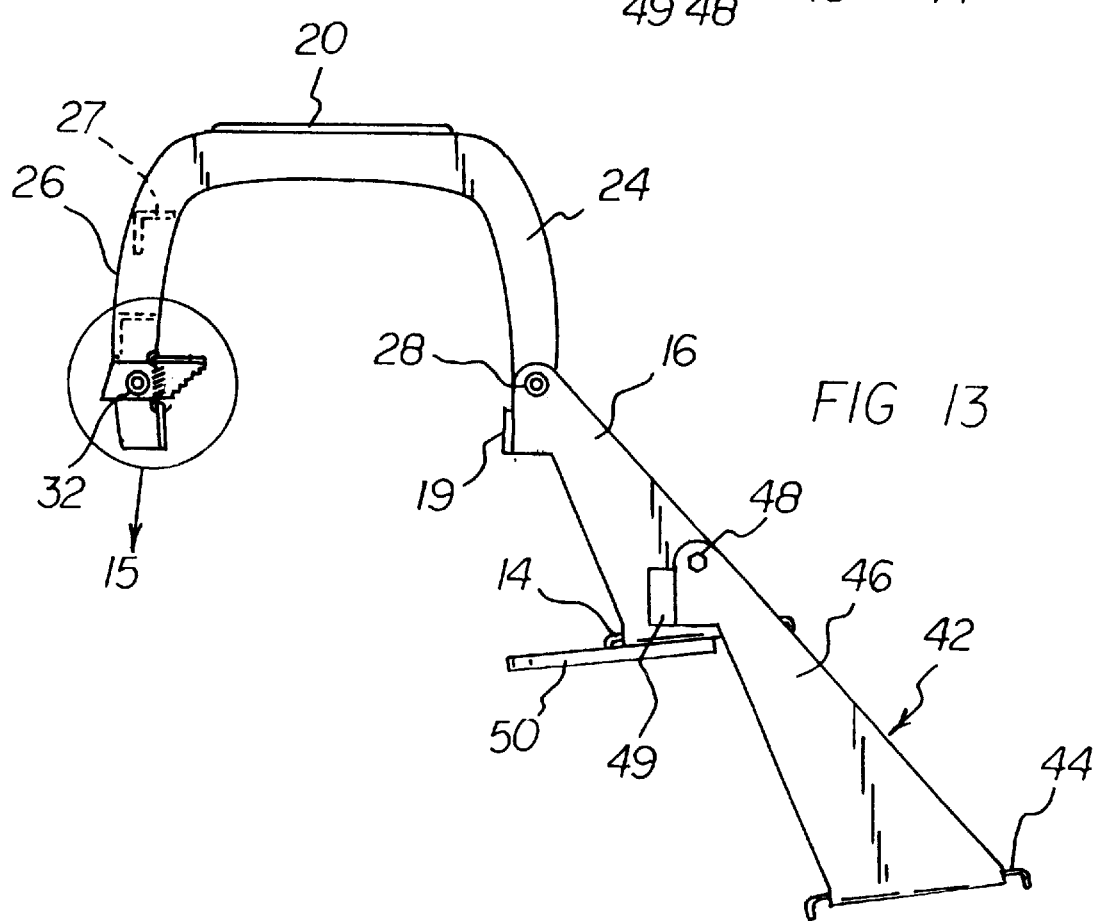

TIRE STEP APPARATUS

RELATED APPLICATION

This application is a continuation-in-part of my prior co-pending application, Ser. No. 09/528,532, filed Mar. 20, 2000, now abondoned.

BACKGROUND OF THE INVENTION

1. Field of the Invention

The present invention relates generally to portable steps to aid mechanics in maintaining and repairing motor vehicles and, more particularly, to portable steps that are supported by a vehicle tire.

2. Description of the Prior Art

Mechanics must work under the hood of a motor vehicle, and, to do so, they often stand on the horizontal surface that supports the motor vehicle. However, there are many motor vehicles which stand so high off of the horizontal support surface that it is difficult for a mechanic to stand on the horizontal support surface and still be able to work under the hood of the motor vehicle. A solution to the problem of enabling a mechanic to work under the hood of a motor vehicle that stands high off of the horizontal support surface is the development of a tire step which is supported by a tire of the motor vehicle and permits a mechanic to stand on the step to gain elevation to enable the mechanic to work under the hood of the motor vehicle.

Throughout the years, a number of innovations have been developed relating to tire steps, and the following U. S. patents are representative of some of those innovations: U.S. Pat. Nos. 2,378,678, 4,782,916, 4,947,961, 5,133,429, and 5,456,479. It is noted that, with each of the above-listed patents, a tire step is provided which has a single step which extends outward from the side of a tire wheel. It would be desirable, however, for very high vehicles, if a second step would be provided that is located above the step that extends outward from the side of the tire wheel.

Another feature in each of the above-listed patents is also noted. Each patent provides a tire step which has a U-shaped structure that fits over the top of a tire on which the respective tire step is installed. Each tire step is retained in position on the vehicle tire by the cumulative weight of the tire step and the person standing on it and by the friction between the U-shaped support structure and the tire. If the tire were wet, the friction between the U-shaped support structure and the tire would be greatly reduced. For this reason, it would be desirable if a tire step were provided which exerts a forceful grip on the tire or wheel to assist in retaining the tire step in a desired position on the vehicle tire.

Still another feature would be desirable in a tire step apparatus. That is, when the tire step apparatus is not in use, it would be desirable if the apparatus can be folded up into a storage orientation that is relatively compact.

Thus, while the foregoing body of prior art indicates it to be well known to use tire steps, the prior art described above does not teach or suggest a tire step apparatus which has the following combination of desirable features: (1) provides a second step that is located above a step that extends outward from the side of the tire wheel; (2) exerts a forceful grip on the tire or wheel to assist in retaining the tire step in a desired position on the vehicle tire; and (3) can be folded up into a storage orientation that is relatively compact when the apparatus is not in use. The foregoing desired characteristics are provided by the unique tire step apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a step apparatus for use with a vehicle tire and includes a first step assembly which includes a first step portion and a pair of first struts extending upward from the first step portion. A second step assembly includes a second step portion and a pair of end bracket members extending downward from the second step assembly. Each of the end bracket members includes a front bracket portion and a rear bracket portion. Hinge members are connected between the first struts and the front bracket portions. A pair of pawl assemblies are connected to the rear bracket portions. When the tire step apparatus is installed on a tire, a person can step up on the first step portion and the second step portion.

Each of the first struts includes a stop member for contacting the tire when the apparatus is installed on the tire. A first tread plate is attached to the first step portion, and a second tread plate is attached to the second step portion. A brace member is connected between the rear bracket portions.

Each of the pawl assemblies includes a pawl hinge connected to one of the rear bracket portions. A pawl plate is connected to the pawl hinge.

The front bracket portions have a front bracket length, and the first struts have a first strut length. The first strut length is greater than the front bracket length, whereby the first step portion is placed in registration in a nested relationship with the second step portion when the first step assembly is placed in a storage orientation or condition with respect to the second step portion.

With another embodiment of the invention, each of the pawl assemblies includes a pawl bias spring connected between the rear bracket portion and the pawl plate. Each pawl plate includes pawl teeth located on an outside edge of the pawl plate. Each pawl plate includes a pawl handle for manually operating the pawl plate. More specifically, each of the bias springs is connected between a respective pawl handle and a respective stop member.

With another embodiment of the invention, a third step assembly is connected to the first step assembly by means of additional hinge members. The third step assembly includes a third step portion and a pair of second struts extending upward from the third step portion. The third step assembly includes second stop members attached to the first struts of the first step assembly. Step-to-wheel support members are connected to the first step assembly and rest on the vehicle wheel or tire when the tire step apparatus is in use on the vehicle tire.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tire step apparatus which has all of the advantages of the prior art and none of the disadvantages.

It is another object of the present invention to provide a new and improved tire step apparatus which may be easily and efficiently manufactured and marketed.

It is a further object of the present invention to provide a new and improved tire step apparatus which is of durable and reliable construction.

An even further object of the present invention is to provide a new and improved tire step apparatus which is susceptible of a low cost of manufacture with regard to both materials and labor, and which accordingly is then susceptible of low prices of sale to the consuming public, thereby making such tire step apparatus available to the buying public.

Still yet a further object of the present invention is to provide a new and improved tire step apparatus which provides a second step that is located above a step that extends outward from the side of the tire wheel.

Still another object of the present invention is to provide a new and improved tire step apparatus that exerts a forceful grip on the tire or wheel to assist in retaining the tire step in a desired position on the vehicle tire.

Yet another object of the present invention is to provide a new and improved tire step apparatus which can be folded up into a storage orientation that is relatively compact when the apparatus is not in use.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a front perspective view showing a first embodiment of the tire step apparatus of the invention installed on a vehicle tire.

FIG. 2 is a rear perspective view of the embodiment of the tire step apparatus shown in FIG. 1.

FIG. 5 is a front view of the embodiment of the invention taken along line 5—5 of FIG. 4.

FIG. 6 is an enlarged view of the pawl portion of the embodiment of the invention shown in FIG. 4 contained in circled region 6 thereof.

FIG. 7 is a side view of a second embodiment of the invention in which the pawl portion has exterior teeth and a bias spring.

FIG. 8 is a front view of the embodiment of the invention of FIG. 7.

FIG. 12 is a top view of the embodiment of the invention shown in FIG.s 10 and 11.

FIG. 13 is a side view of the embodiment of the invention shown in FIGS. 10–12.

DESCRIPTION OF THE PREFERRED EMBODIMENT

Figure 3:
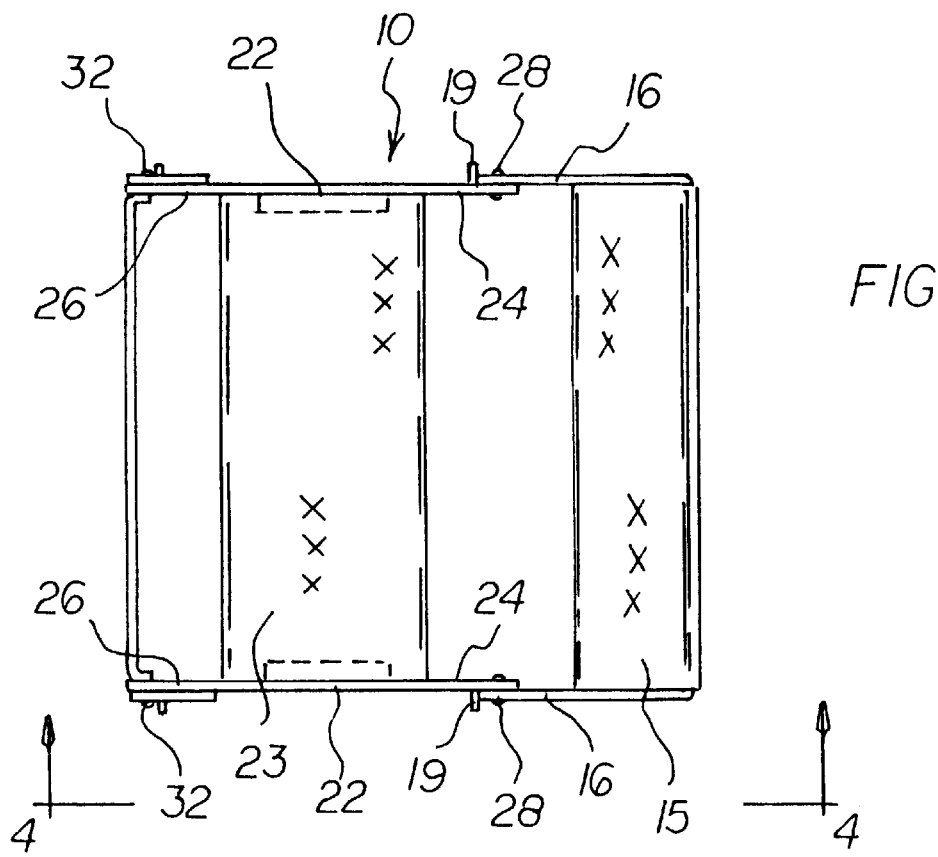
FIG. 3 is a top view of the embodiment of the tire step apparatus of FIG. 2.
Figure 4:
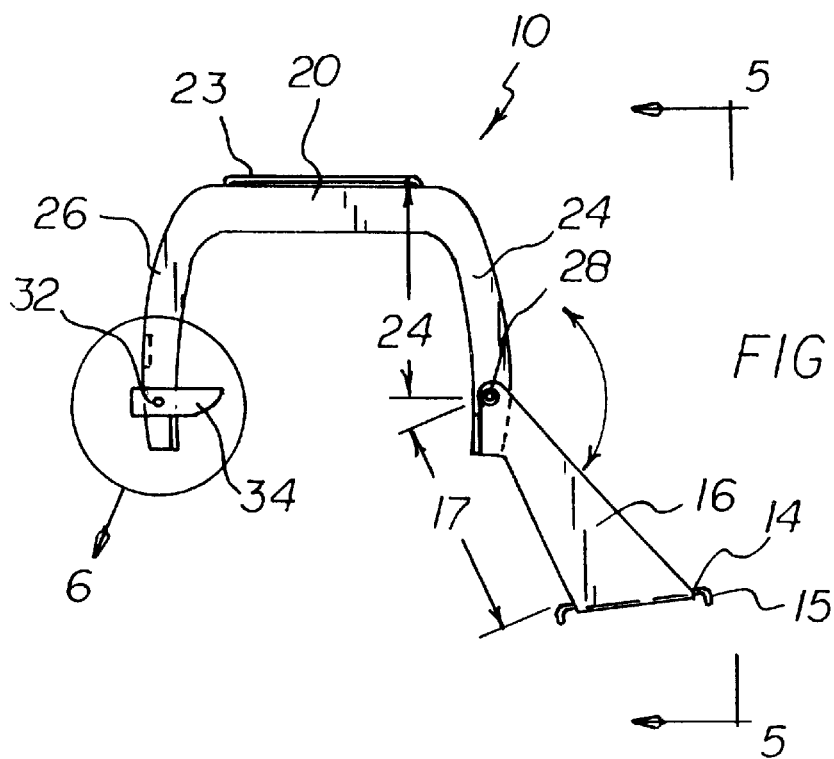
FIG. 4 is a side view of the embodiment of the invention shown in FIG. 3 taken along line 4—4 thereof.

With reference to the drawings, a new and improved tire step apparatus embodying the principles and concepts of the present invention will be described.

Turning to FIGS. 1–6, there is shown a first embodiment of the tire step apparatus of the invention generally designated by reference numeral 10. The tire step apparatus 10 is provided for use on a vehicle tire 11 and includes a first step assembly 12 which includes a first step portion 14 and a pair of first struts 16 extending upward from the first step portion 14. A second step assembly 18 includes a second step portion 20 and a pair of end bracket members 22 extending downward from the second step assembly 18. Each of the end bracket members 22 includes a front bracket portion 24 and a rear bracket portion 26. Hinge members 28 are connected between the first struts 16 and the front bracket portions 24. A pair of pawl assemblies 30 are connected to the rear bracket portions 26. When the tire step apparatus 10 is installed on a tire 11, a person can step up on the first step portion 14 and the second step portion 20.

Each of the first struts 16 includes a stop member 19 for contacting the tire 11 when the apparatus is installed on the tire 11. A first tread plate 15 is attached to the first step portion 14, and a second tread plate 23 is attached to the second step portion 20. A brace member 27 is connected between the rear bracket portions 26.

Each of the pawl assemblies 30 includes a pawl hinge 32 connected to one of the rear bracket portions 26. A pawl plate 34 is connected to the pawl hinge 32.

The front bracket portions 24 have a front bracket length 25, and the first struts 16 have a first strut length 17. The first strut length 17 is greater than the front bracket length 25, whereby the first step portion 14 is placed in registration in a nested relationship with the second step portion 20 when the first step assembly 12 is placed in a storage orientation or condition with respect to the second step portion 20.

Figure 9:
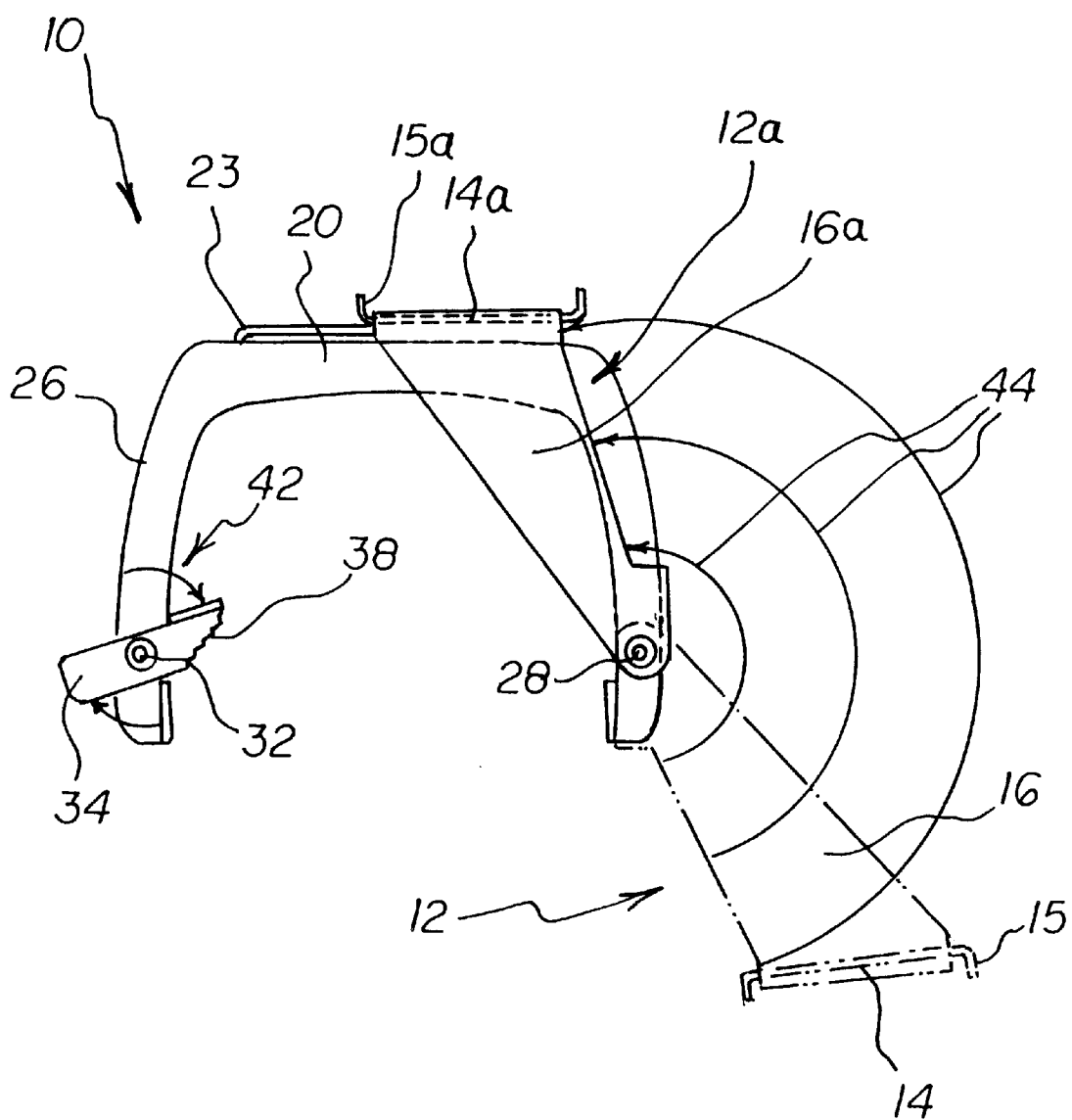
FIG. 9 a side view of the embodiment of the invention shown in FIG. 7 illustrating the first step in a folded and nested relationship with a second step.
Figure 10:
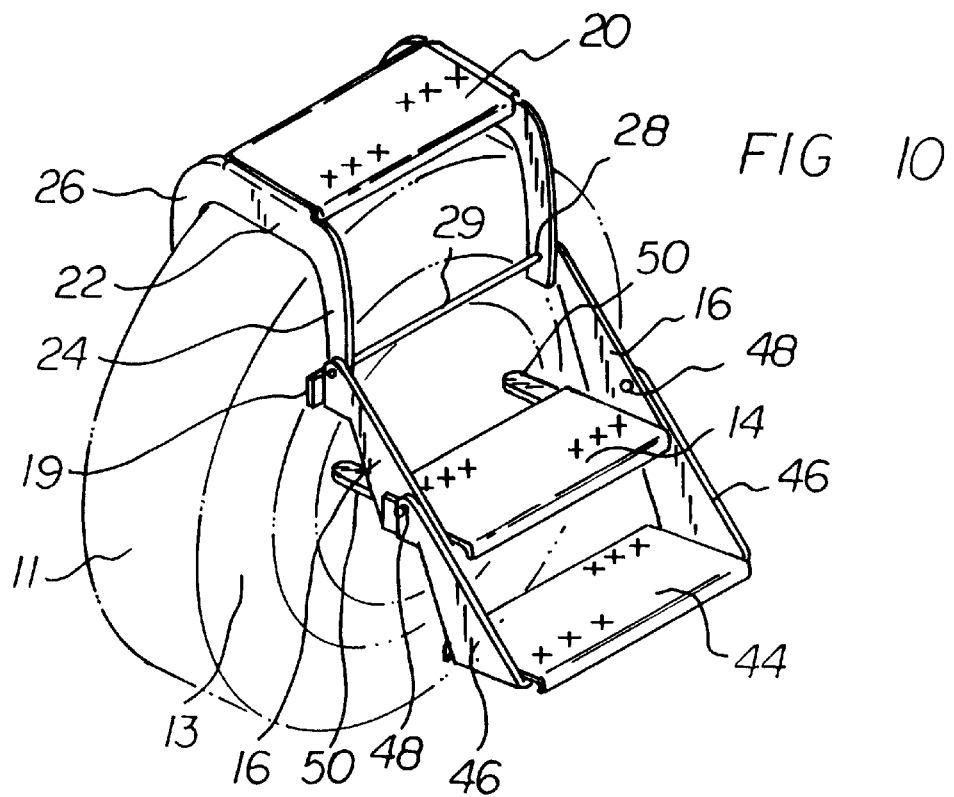
FIG. 10 is a front perspective view of a third embodiment of the invention installed on a vehicle tire.
Figure 11:
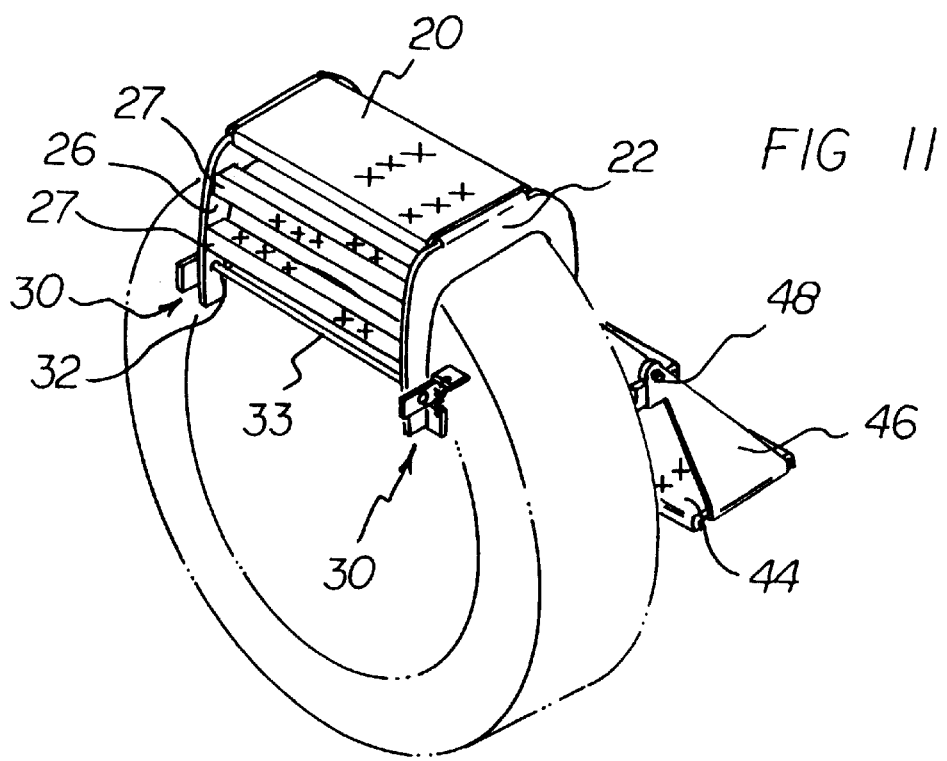
FIG. 11 is a rear perspective view of the embodiment of the invention shown in FIG. 10.
Figure 14:
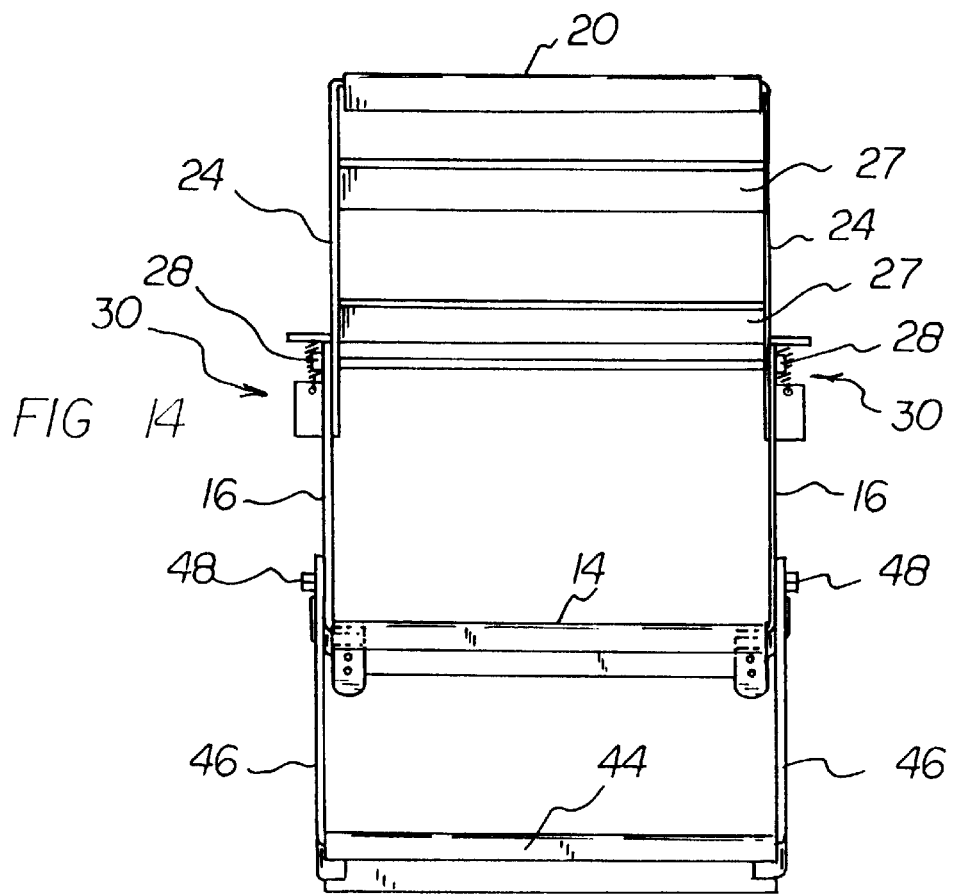
FIG. 14 is a front view of the embodiment of the invention shown in FIGS. 10–13.

Turning to FIGS. 7–9, a second embodiment of the invention is shown. Reference numerals are shown that correspond to like reference numerals that designate like elements shown in the other figures. In this embodiment of the invention, each of the pawl assemblies 30 includes a pawl bias spring 36 connected between the rear bracket portion 26 and the pawl plate 34. Each pawl plate 34 includes pawl teeth 38 located on an outside edge of the pawl plate 34. Each pawl plate 34 includes a pawl handle 40 for manually operating the pawl plate 34. More specifically, each of the bias springs 36 is connected between a respective pawl handle 40 and a respective stop member 19.

To use either embodiment of the invention, as shown in FIGS. 1 and 2, a tire 11 is selected, and the end bracket members 22 of the second step assembly 18 are placed over the tire 11. More specifically, the front bracket portions 24 are placed in contact with the front of the tire 11, and the rear bracket portions 26 are placed in contact with the rear of the tire 11. The second step portion 20 is placed on top of the tire 11. When the second step assembly 18 is installed on the tire 11 in this manner, the first step assembly 12 extends out from the front of the wheel 13 on which the tire 11 is mounted. As the rear bracket portions 26 are installed on the rear of the tire 11, the front portions of the pawl plates 34 are pushed upward, around their pawl hinges 32 by the tire 11. Once the tire step apparatus 10 is fully installed on the tire 11, if there is an upward force on the rear bracket portions 26 or the second step portion 20, the front portions of the pawl plates 34 dig into the rear wall of the tire 11 or are forced into contact with the rear of the wheel 13. As a result, the pawl plates 34 prevent the second step portion 20 from lifting off of the top of the tire 11.

When the second step assembly 18 has been installed on the tire 11, a person can step on the first step portion 14, and then step higher onto the second step portion 20. The stop members 19 press up against either the tire 11 or the wheel 13 to retain the first step portion 14 in a horizontal orientation. The stop members 19 prevent the first struts 16 from rotating around the hinge members 28 to such a degree that the second step portion 20 is not in a substantially horizontal orientation. This is true especially when a person is standing on the first step portion 14.

To remove the tire step apparatus 10 from the tire 11, the rear portions of the pawl plates 34 are pressed downward causing the front portions of the pawl plates 34 to rotate around the pawl hinges 32 away from the tire 11, thereby permitting the second step assembly 18 to be lifted off of the tire 11.

Once the tire step apparatus 10 has been removed from the tire 11, the tire step apparatus 10 can be placed in a storage condition, such as shown in FIG. 9 discussed below.

In FIGS. 7–9, a second embodiment of the invention is illustrated in which the pawl plates 34 are provided with pawl bias springs 36, pawl teeth 38, and pawl handles 40. More specifically, the bias springs 36 are connected between respective pawl handles 40 and respective stop members 19. Without any outside force being exerted on the pawl plates 34, the bias springs 36 urge the pawl teeth 38 forward of the rear bracket portions 26. When the second step assembly 18 is lowered onto the tire 11, the pawl teeth 38 contact the rear of the tire 11, and the front portions of the pawl plates 34 are moved counterclockwise around the pawl hinges 32 as shown by four concentric curved lines 42 shown in FIG. 9.

When the tire step apparatus 10 is installed on the tire 11, the bias springs 36 urge the pawl teeth 38 into firm contact with the tire 11 or the wheel 13. Then, if there is an upward force on the rear bracket portions 26 or the second step portion 20, the pawl teeth 38 dig into the tire 11 or the wheel 13 to prevent the second step assembly 18 from riding up on the tire 11.

To remove this embodiment of the tire step apparatus 10 from the tire 11, a person pushes downward on the pawl handles 40, overcoming the bias of the bias springs 36, causing the front portions of the pawl plates 34 to rotate counterclockwise around the pawl hinges 32. As a result, the pawl teeth 38 are removed from gripping the tire 11 or the wheel 13, and the second step assembly 18 can be lifted off of the tire 11.

Placing either embodiment of the invention in a storage orientation is illustrated in FIG. 9. More specifically, the orientation of the first step assembly 12 in an in-use orientation is shown as first step assembly 12, first step portion 14, and first struts 16 in FIG. 9. However, when the first step assembly is swung counterclockwise around the hinge members 28, shown by concentric dashed lines 44, the first step assembly is in the storage orientation as shown by first step assembly 12*a*. In the storage orientation, the first step portion is shown as first step portion 14*a*, and the first struts are shown as first struts 16*a*. In the storage orientation, the first tread plate 15 is in nesting registration with and is resting upon the second tread plate 23.

Turning to FIGS. 10–16, a third embodiment of the invention is shown. Reference numerals are shown that correspond to like reference numerals that designate like elements shown in the other figures. In addition, a third step assembly 42 is connected to the first step assembly 12 by means of additional hinge members 48. The third step assembly 42 includes a third step portion 44 and a pair of second struts 46 extending upward from the third step portion 44. The third step assembly 42 includes second stop members 49 attached to the first struts 16 of the first step assembly 12. Step-to-wheel support members 50 are connected to the first step assembly 12. More specifically, the step-to-wheel support members 50 comprise elongated stand-off members suitably rigidly connected to the underside of first step portion 14 and extend in parallel spaced fashion relative to each beyond the rear edge of first step portion 14 substantially as shown. In accordance with the invention, the step-to-wheel support members 50 have a longitudinal extent such that the distal ends thereof are adapted to abut against the wheel center portion of tire 11 (FIG. 10) and thereby to provide enhanced stabilization support for the apparatus 10 when an individual steps on step portions 14 or 44 as will occur in an obvious manner to those of ordinary skill. Step-to-wheel support members 50 preferably are fabricated from molded polypropylene plastic, but any suitable durable strong material may be used instead.

In many ways, the third embodiment of the invention operates similarly to the operation of the first and second embodiments of the invention described above. That is to say, in the third embodiment of the invention, the operation of the first step assembly 12 with respect to the second step assembly 18 is similar to the operation of the first step assembly 12 with respect to the second step assembly 18 in the first and second embodiments of the invention.

More specifically with respect to the third step assembly 42, when the third embodiment of the invention is in an in-use orientation shown in FIGS. 10–14, the third step assembly 42 has been rotated around the additional hinge members 48 so that the third step portion 44 is substantially horizontal, just as the first step portion 14 is substantially horizontal. In this orientation, a back portion of the second struts 46 rest up against the second stop members 49 which are located on the first struts 16 of the first step assembly 12. Also, in this orientation, the step-to-wheel support members 50 rest up against a portion of the vehicle wheel or vehicle tire 11.

Figure 15:
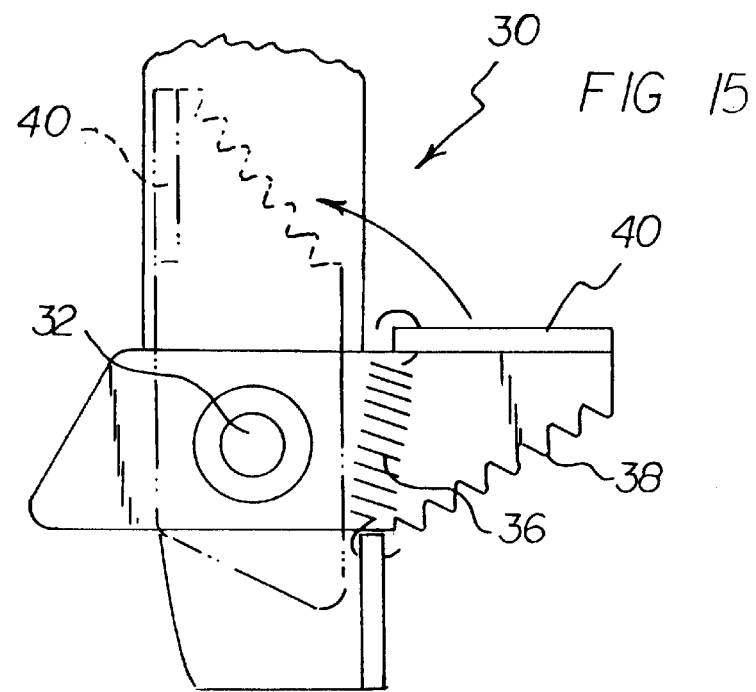
FIG. 15 is an enlarged view of the portion of the invention shown in circled region 15 of FIG. 13.

Also, with the third embodiment of the invention, each of the pawl assemblies 30, as shown in greatest detail in FIG. 15, includes a pawl hinge 32, a pawl bias spring 36, pawl teeth 38, and a pawl handle 40 which operate in a manner similar to the operation of the pawl assemblies 30 described above in connection with the second embodiment of the invention shown in FIGS. 7 and 8.

Figure 16:
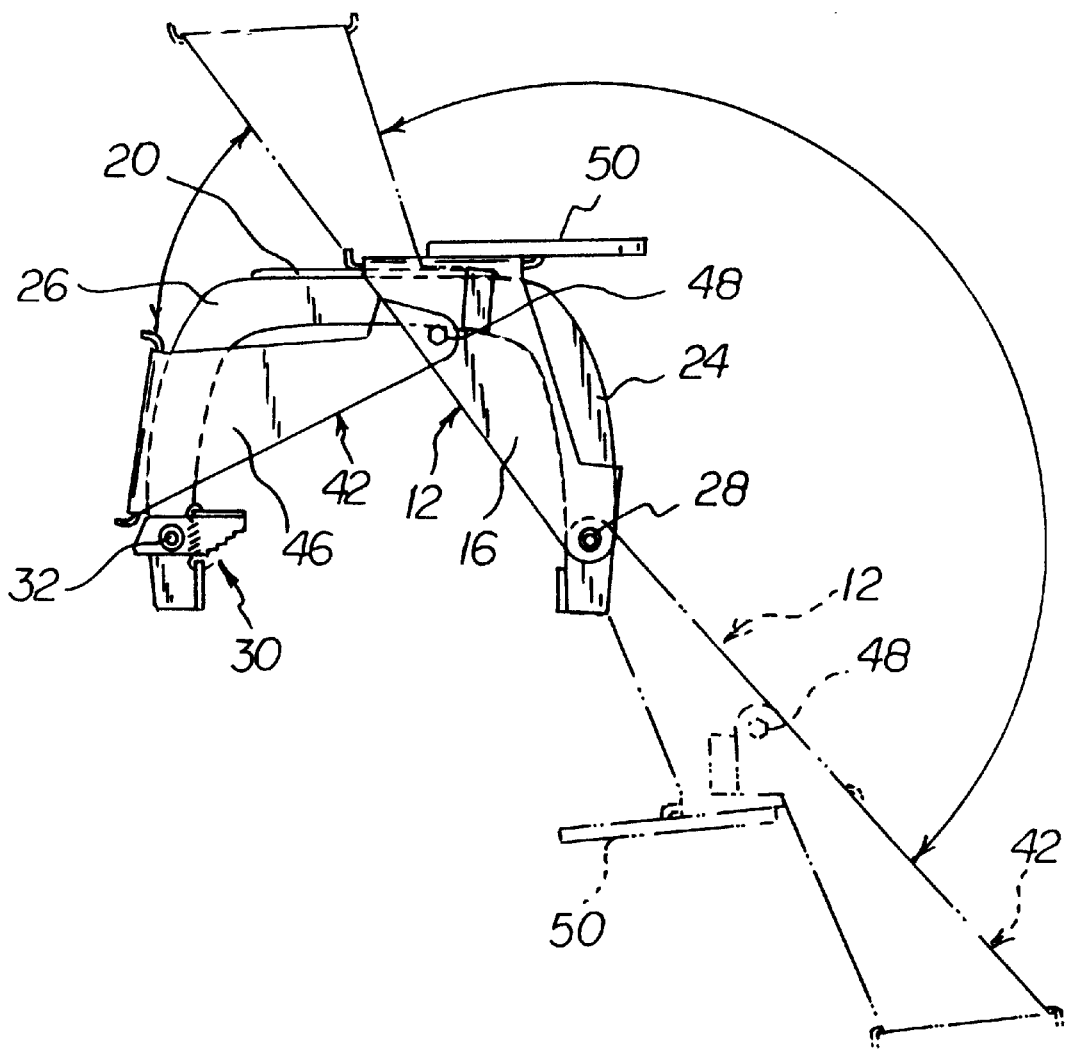
FIG. 16 is a side view of the embodiment of the invention shown in FIG. 13, with the tire step apparatus in a folded up condition in solid lines and in an unfolded condition in broken lines.

Also, as shown in FIG. 16, when the third embodiment of the invention is oriented in a storage mode, the first step assembly 12 is folded around the hinge members 28; and the third step assembly 42 is folded around the additional hinge members 48. In this respect, the third step assembly 42 is folded around the second step assembly when in a storage orientation. As a result, the tire step apparatus 10 is in a compact storage mode shown in solid lines in FIG. 15.

A few additional details are noted with respect to the third embodiment of the invention. The pawl hinges 32 are located at the ends of pawl axle 33 which extends between a pair of pawls. Also, there are plural brace members 27 which are in the form of right-angled struts. Also, the hinge members 28 are located at the ends of hinge axle 29 which extends between a pair of hinge members 28.

The components of the tire step apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tire step apparatus that is low in cost, relatively simple in design and operation, and which may advantageously be used to provide a second step that is located above a step that extends outward from the side of the tire wheel. With the invention, a tire step apparatus is provided which exerts a forceful grip on the tire or wheel to assist in retaining the tire step in a desired position on the vehicle tire. With the invention, a tire step apparatus is provided which can be folded up into a storage orientation that is relatively compact when the apparatus is not in use.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A portable, folding step apparatus adapted for use on a vehicle wheel and tire assembly to facilitate access above the tire of said assembly, comprising:

a first step assembly which includes a first step portion and a pair of first struts extending upward from said first step portion, a second step assembly which includes a second step portion and a pair of end bracket members extending downward from said second step assembly, wherein each of said end bracket members includes a front bracket portion and a rear bracket portion, each of said end bracket members being sized and configured to straddle a top portion of said tire of said tire and wheel assembly such that each said front bracket portion is adapted to engage the front of said tire and each said rear bracket portion is adapted to engage the rear of said tire, hinge members connecting said first struts and said front bracket portions wherein said first step assembly is adapted to be rotated relative to said second step assembly between a first use position and a second storage position such that said second step portion comes to rest substantially co-extensively on said first step portion in said second position, and stop members on said front bracket portions such that said first step assembly struts engage said stop members when said first step assembly is rotated into said first use position.

2. The apparatus of claim 1, further including:

a first tread plate attached to said first step portion.

3. The apparatus of claim 1, further including:

a second tread plate attached to said second step portion.

4. The apparatus of claim 1, further including:

a brace member connected between said rear bracket portions.

5. The apparatus of claim 1 wherein:

said front bracket portions have a front bracket length, said first struts have a first strut length, said first strut length is greater than said front bracket length, whereby said first step portion is placed in registration with said second step portion when said first step assembly is placed in said second position.

6. The apparatus of claim 1 including at least one pawl assembly connected to at least one of said rear bracket portions, said at least one pawl assembly includes:

a pawl hinge connected to one of said rear bracket portions, and a pawl plate connected to said pawl hinge.

7. The apparatus of claim 6 wherein said at least one pawl assembly includes:

a pawl bias spring connected between said rear bracket portion and said pawl plate.

8. The apparatus of claim 7 wherein each of said bias springs is connected between a respective pawl handle and a respective stop member.

9. The apparatus of claim 6 further including pawl teeth located on an outside edge of each said pawl plate.

10. The apparatus of claim 6 wherein each said pawl plate includes a pawl handle for manually operating said pawl plate.

11. The apparatus of claim 1 wherein each of said first struts includes a stop member for contacting the tire when the apparatus is installed on the tire.

12. The apparatus of claim 1, further including:
a third step assembly connected to said first step assembly by means of additional hinge members.

13. The apparatus of claim 12 wherein said third step assembly includes a third step portion and a pair of second struts extending upward from said third step portion.

14. The apparatus of claim 12 wherein said third step assembly includes second stop members attached to said first struts of said first step assembly.

15. The apparatus of claim 12, further including:
step-to-wheel support members connected to said first step assembly.

16. The apparatus of claim 12 wherein said third step assembly includes a third step portion, said third step portion being adapted to rotate relative to said first and second step portions by the action of said additional hinge members such that said third step portion confronts said rear bracket portions when said first step assembly is rotated relative to said second step assembly between said first position and said second position and said second step portion rests on said first step portion.

* * * * *